United States Patent [19]

Shiraishi

[11] Patent Number: 4,515,417

[45] Date of Patent: May 7, 1985

[54] GROUNDING DEVICE FOR PREVENTING ELECTROLYTIC CORROSION IN THE BEARINGS OF ROTARY ELECTRIC MACHINES

[75] Inventor: Akiyoshi Shiraishi, Kobe, Japan

[73] Assignee: Mitsubishi Denki Kabushiki Kaisha, Tokyo, Japan

[21] Appl. No.: 532,592

[22] Filed: Sep. 15, 1983

[30] Foreign Application Priority Data

Nov. 24, 1982 [JP] Japan .......................... 57-178622[U]

[51] Int. Cl.³ ............................................ F16C 41/04
[52] U.S. Cl. .................................... 384/445; 384/490; 384/537
[58] Field of Search ........... 308/189 R, 207 R, 189 A, 308/207 A; 384/135, 136, 94

[56] References Cited

U.S. PATENT DOCUMENTS

| 1,572,287 | 2/1926 | Heitman et al. | 384/277 |
| 4,320,317 | 3/1982 | Bowey | 308/189 R |
| 4,386,812 | 6/1983 | Anderson | 308/189 R |

OTHER PUBLICATIONS

"Shaft Current in Rotating Machinery" by Ryoichi Kuramochi, Fuji Electric Journal, vol. 38, No. 8, 1965, pp. 29-36 & 64.

Primary Examiner—Lenard A. Footland
Attorney, Agent, or Firm—Wenderoth, Lind & Ponack

[57] ABSTRACT

A grounding device for preventing electrolytic corrosion in the bearings of rotary electric machines including a bearing which supports the shaft of a rotor in a stator which is grounded, an electrically conductive end cover which is mounted on the stator so as to surround the bearing and a centrifugal contact point which is mounted on the shaft, which is in contact with the end cover when the machine is standing still or rotating at low speeds to short-circuit the shaft and the end cover, and which breaks the short-circuited condition as the running speed of the shaft increases.

3 Claims, 5 Drawing Figures

FIG. 1 PRIOR ART
FIG. 2 PRIOR ART
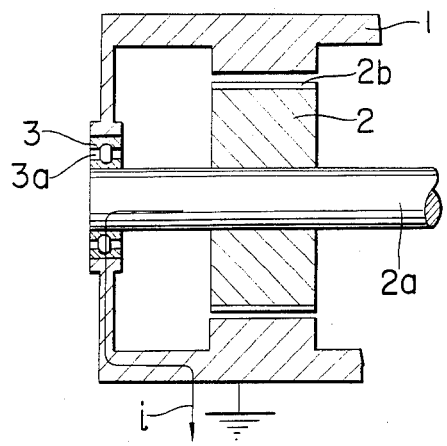
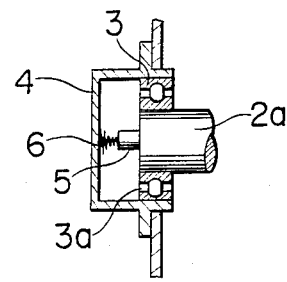
FIG. 3
FIG. 5
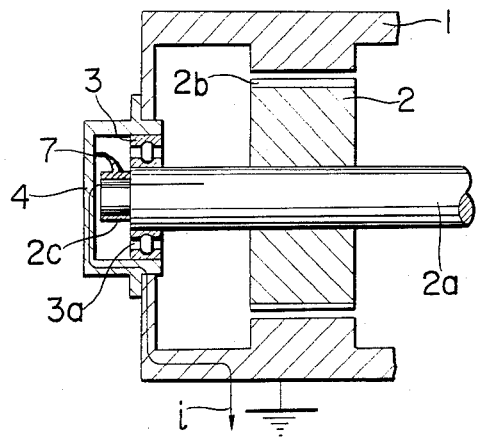
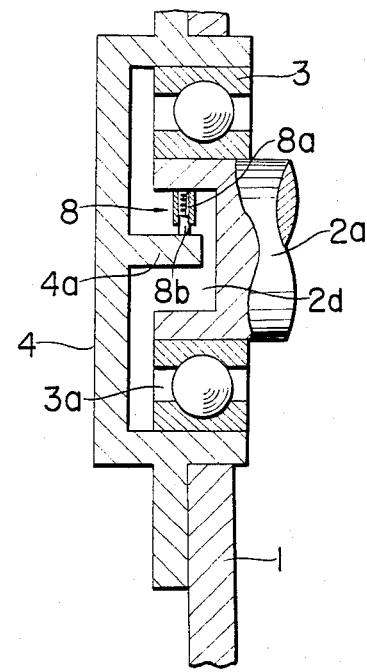
FIG. 4
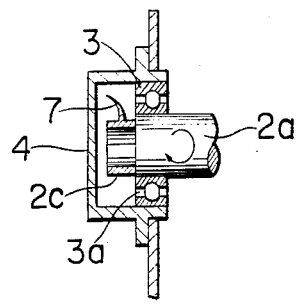

GROUNDING DEVICE FOR PREVENTING ELECTROLYTIC CORROSION IN THE BEARINGS OF ROTARY ELECTRIC MACHINES

BACKGROUND OF THE INVENTION

1. Field of the Invention

This invention relates to a grounding device for preventing electrolytic corrosion in the bearings of rotary electric machines. More specifically, the invention relates to a grounding device for preventing electrolytic corrosion in the bearings of rotary electric machines, which inhibits the electric current from flowing into the bearings at the time when the rotary electric machine is started where the grease in the bearings exhibits a small resistance to the shaft voltage that is generated in the rotary electric machines.

2. Description of the Prior Art

FIG. 1 is a diagram which schematically illustrates a conventional rotary electric machine. In FIG. 1, a rotor 2 is disposed in a grounded stator 1. A shaft 2a of the rotor 2 is supported by bearings 3 which contain a lubricating agent 3a. Grease is generally used as a lubricating agent 3a. As is well known, the grease exhibits an electric resistance which is large when the bearings are rotating, and exhibits a small resistance when the bearings are at rest or are rotating at speeds close to rest. A voltage is generated in the shaft 2a due to a variety of reasons. For instance, a voltage is electrostatically induced in the shaft 2a when a high-frequency current flows into the coil or bar 2b of the rotor 2. A shaft voltage is generated at the moment a starting voltage is applied to the rotary electric machine. At that moment, the rotary electric machine still does not rotate due to inertia, and the grease 3a in the bearing 3 exhibits a small resistance, thereby allowing a large electric current i to flow through the shaft 2a, bearing 3 and stator 1 as shown in FIG. 1, giving rise to the occurrence of electrolytic corrosion in the bearing 3. To prevent the electric current from flowing into the bearing 3, therefore, a brush 5 had heretofore been attached to an electrically conductive end cover 4 by a spring 6 as shown in FIG. 2. According to this construction, the shaft 2a is pushed by the brush 5 to short-circuit the bearing 3. With the thus constructed conventional device, however, the brush 5 is subject to be worn out, and cumbersome maintenance is required, i.e., the brush 5 must be checked and renewed frequently.

SUMMARY OF THE INVENTION

This invention has for its object to eliminate the above-mentioned defects inherent in the conventional art. According to this invention, the shaft of the rotor is equipped with a centrifugal contact point which short-circuits the rotor shaft and the end cover at low speeds, and which undergoes deformation or displacement to open the short-circuited condition as the running speed of the rotor increases. Thus, the invention provides a grounding device for preventing electrolytic corrosion in the bearings of rotary electric machines, which does not require maintenance.

BRIEF DESCRIPTION OF THE DRAWINGS

FIG. 1 is a partly cut-away front view of a conventional grounding device for preventing electrolytic corrosion in the bearings of rotary electric machines;

FIG. 2 is a partly cut-away front view of another conventional grounding device;

FIG. 3 is a partly cut-away front view of a grounding device for preventing a electrolytic corrosion in the bearings of rotary electric machines according to an embodiment of the present invention;

FIG. 4 is a diagram which illustrates the operation of the grounding device of FIG. 3; and FIG. 5 is a partly cut-away front view of a grounding device according to another embodiment of the present invention.

In the drawings, the same reference numerals denote the same or corresponding portions.

DESCRIPTION OF THE PREFERRED EMBODIMENTS

Embodiments of the invention will be described below with reference to the drawings. In FIG. 3, reference numeral 1 denotes a stator, reference numeral 2 denotes a rotor, reference numeral 2a denotes a shaft, reference numeral 3 denotes a bearing, reference numeral 4 denotes an electrically conductive end cover attached to the stator 1, and reference numeral 7 denotes a centrifugal contact point which is attached to a protrusion 2c of the shaft 2a. The centrifugal contact point 7 is made of a resilient metal and has a curved shape, one end portion thereof being in contact with the end cover 4 when the motor is standing still or rotating at low speeds.

Being constructed as mentioned above, the centrifugal contact point 7 contacts the end cover 4 as shown in FIG. 3 when the rotary electric machine is at rest or is running at speeds close to rest, namely just at the moment of starting. Therefore, an electric current i flows at the moment the shaft voltage is induced at the time of starting through the shaft 2a, protrusion 2c, contact 7, cover 4, and stator 1, thereby bypassing the bearing 3, and accordingly, no current flows through the bearing 3. As the running speed of the shaft 2a gradually increases, the curvature of the contact point 7 decreases due to the centrifugal force as shown in FIG. 4. That is, the contact point 7 separates from the end cover 4, and the grounding circuit therethrough is broken.

Thus, the bearing is prevented from being electrolytically corroded at the time of starting, and is thereby prevented from being worn out, obviating the need for maintenance.

FIG. 5 illustrates another embodiment in which a centrifugal contact point 8 having a contactor 8b which is urged by a spring 8a toward the centre of the shaft 2a, is provided in a recessed portion 2d of the shaft 2a. The contactor 8b contacts a protrusion 4a of the end cover 4 when the motor is standing still or rotating at low speeds. As the running speed of the shaft 2a increases, the contactor 8b displaces outwardly due to the centrifugal force overcoming the force of the spring 8a, and is separated from the protrusion 4a.

According to the present invention, the rotary shaft is provided with a centrifugal contact point that automatically contacts or separates from an end cover, to prevent a shaft current from flowing at the time of starting through shaft bearings, thereby eliminating the occurrence of electrolytic corrosion in the bearings.

What is claimed is:

1. A rotary machine having a grounding device for preventing electrolytic corrosion in the bearings thereof, comprising:

a stator having means for being grounded;

a rotor having a shaft, in said stator;
a bearing rotatively supporting said shaft;
an electrically conductive end cover mounted on said stator so as to surround said bearing; and
a centrifugal contact point mounted on said shaft, said contact point being responsive to rotation of said shaft so as to be in contact with said end cover when said shaft is standing still or rotating at low speeds to short-circuit said shaft and said end cover, and separated from said end cover to break the short-circuited condition as the speed of rotation of said shaft increases.

2. A rotary electric machine according to claim 1, wherein said shaft has a protrusion formed thereon and said centrifugal contact point comprises a resilient metal member having one end fastened to said protrusion and the other end bent to come into contact with said end cover.

3. A rotary electric machine according to claim 1, wherein said shaft has a recess formed at an end thereof and said centrifugal contact point comprises:
a contactor which is mounted on a peripheral surface of said recessed portion in said recessed portion, said contractor having a spring so as to be displaced in the radial direction of said shaft due to centrifugal force in response to rotation of said shaft to overcome the force of said spring as the speed of rotation of said shaft increases.

* * * * *